US010145034B2

(12) United States Patent
Bas et al.

(10) Patent No.: US 10,145,034 B2
(45) Date of Patent: *Dec. 4, 2018

(54) RFL-FREE DIPPING COMPOSITION PROVIDING HIGH PERFORMANCE FOR CORD FABRICS

(71) Applicant: KORDSA TEKNIK TEKSTIL A.S., Kocaeli (TR)

(72) Inventors: Serkan Bas, Kocaeli (TR); Nurcin Cevahir, Kocaeli (TR); Ersin A. Acar, Istanbul (TR)

(73) Assignee: Kordsa Teknik Tekstil A.S., Kocaeli (TR)

( * ) Notice: Subject to any disclaimer, the term of this patent is extended or adjusted under 35 U.S.C. 154(b) by 0 days.

This patent is subject to a terminal disclaimer.

(21) Appl. No.: 14/651,419

(22) PCT Filed: Apr. 22, 2014

(86) PCT No.: PCT/TR2014/000123
§ 371 (c)(1),
(2) Date: Jun. 11, 2015

(87) PCT Pub. No.: WO2014/175844
PCT Pub. Date: Oct. 30, 2014

(65) Prior Publication Data
US 2015/0315410 A1 Nov. 5, 2015

(30) Foreign Application Priority Data

Apr. 26, 2013 (TR) .................. 2013/05016

(51) Int. Cl.
| | |
|---|---|
| *D02G 3/40* | (2006.01) |
| *C09D 147/00* | (2006.01) |
| *D02G 3/04* | (2006.01) |
| *D02J 1/04* | (2006.01) |
| *D06M 15/227* | (2006.01) |
| *D06M 15/233* | (2006.01) |
| *D06M 15/263* | (2006.01) |
| *D06M 15/356* | (2006.01) |
| *D06M 15/55* | (2006.01) |
| *D06M 15/693* | (2006.01) |
| *D06M 101/32* | (2006.01) |
| *D06M 101/34* | (2006.01) |

(52) U.S. Cl.
CPC .......... *D02G 3/404* (2013.01); *C09D 147/00* (2013.01); *D02G 3/045* (2013.01); *D02J 1/04* (2013.01); *D06M 15/227* (2013.01); *D06M 15/233* (2013.01); *D06M 15/263* (2013.01); *D06M 15/3562* (2013.01); *D06M 15/55* (2013.01); *D06M 15/693* (2013.01); *D06M 2101/32* (2013.01); *D06M 2101/34* (2013.01)

(58) Field of Classification Search
CPC ....... D02G 3/045; D02G 3/404; C09D 147/00
See application file for complete search history.

(56) References Cited

U.S. PATENT DOCUMENTS

| | | | |
|---|---|---|---|
| 4,472,463 A | 9/1984 | Solomon | |
| 4,476,191 A | 10/1984 | Girgis | |
| 5,118,545 A | 6/1992 | Burlett et al. | |
| 5,286,783 A | 2/1994 | Hisaki et al. | |
| 5,565,507 A | 10/1996 | Marco et al. | |
| 5,939,159 A | 8/1999 | Shiono et al. | |
| 9,394,647 B2 | 7/2016 | Ikeda et al. | |
| 2004/0249053 A1 | 12/2004 | Huynh-Tran et al. | |
| 2008/0121327 A1 | 5/2008 | Matsumura et al. | |
| 2012/0041113 A1 | 2/2012 | Ikeda et al. | |
| 2015/0259560 A1* | 9/2015 | Cevahir | ..................... C08J 5/06 523/438 |

FOREIGN PATENT DOCUMENTS

| | | |
|---|---|---|
| CN | 102414362 A | 4/2012 |
| JP | 02127571 A | 5/1990 |
| JP | 03097965 A | 4/1991 |
| JP | 2002309220 A | 10/2002 |
| JP | 2007046210 A | 2/2007 |

(Continued)

OTHER PUBLICATIONS

Office Action issued by the Korean Intellectual Property Office (KIPO) dated Aug. 23, 2016, for corresponding Korean Patent Application No. 10-2015-7017143.
International Search Report dated Aug. 12, 2014, for International Patent Application No. PCT/TR2014/000123.
International Preliminary Report on Patentability dated Apr. 10, 2015, for International Patent Application No. PCT/TR2014/000123.
International Search Report and Written Opinion dated Mar. 18, 2014, for International Patent Application No. PCT/IB2013/060693.
Office Action mailed by the State Intellectual Patent Office of P.R. China dated Mar. 2, 2017, for corresponding Patent Application No. 201380065132.6. (With English Translation).

(Continued)

*Primary Examiner* — Shaun R Hurley
(74) *Attorney, Agent, or Firm* — Pergament & Cepeda LLP; Milagros A. Cepeda; Edward D. Pergament

(57) ABSTRACT

The present invention relates to a dipping material composition for cord fabric which is free of resorcinol and formaldehyde and production methods thereof comprising the steps of adding an acrylic resin containing a carboxylic acid group, adjusting pH value, adding an epoxy resin, adding a blocked polyisocyanate, adding a styrene butadiene latex and adding a styrene butadiene vinylpyridine latex into water, obtaining the dipping material, enabling the synthetic fiber and the rubber used in cord fabric reinforced rubber materials production to be attached to each other by providing an interface between the two said materials. Since the composition is formaldehyde-free, it is not as hazardous for human health as resorcinol-formaldehyde-latex (RFL) based systems and it is also environmentally friendly.

26 Claims, No Drawings

(56) References Cited

FOREIGN PATENT DOCUMENTS

JP   2011069020 A   4/2011
JP   2012224962 A   11/2012

OTHER PUBLICATIONS

Non-Final Office Action mailed by the USPTO dated Nov. 4, 2016, for corresponding U.S. Appl. No. 14/441,121.
Final Office Action mailed by the USPTO dated May 25, 2017, for corresponding U.S. Appl. No. 14/441,121.
Non-Final Office Action mailed by the USPTO dated Jan. 10, 2018, for corresponding U.S. Appl. No. 14/441,121.

* cited by examiner

RFL-FREE DIPPING COMPOSITION PROVIDING HIGH PERFORMANCE FOR CORD FABRICS

This application is a National Stage Application under 35 U.S.C. § 371 of PCT International Application No. PCT/TR2014/000123 filed Apr. 22, 2014, which claims the benefit of Turkish Application No. 2013/05016, filed Apr. 26, 2013, all of which are hereby incorporated by reference in their entireties.

FIELD OF THE INVENTION

The present invention relates to an environmentally friendly dipping material composition, which forms an interphase between the synthetic fiber that is used in the production of cord fabric and rubber and thus bonds the said two structures to each other.

BACKGROUND OF THE INVENTION

Cord fabric is used as tire reinforcement material. Since the chemical structures of synthetic fibers used in cord fabric production and rubber are considerably different from each other, the said materials are incompatible with each other in terms of their chemical and physical structures. Synthetic fibers have high strength and low elongation whereas rubbers are polymeric materials which have high elongation and low strength. The polar groups (amide, hydroxyl and carbonyl groups) present in the structure of the synthetic fibers are incompatible with the non-polar structures of the rubber. This incompatibility present in the state of the art is eliminated with water-based Resorcinol-Formaldehyde-Latex (RFL) adhesive solutions which form a phase between the cord and the rubber and enable the rubber and the fiber to be attached to each other.

Main function of RFL is to serve as an adhesive bonding two incompatible structures by forming a phase between fiber and rubber. RF functional group in RFL is attached to the polar groups of fiber while Latex (L) group is attached to the fiber by vulcanization, and thus the rubber-fiber composite structure is formed. The vehicle tire application is amongst the most significant product examples wherein the said composite structure is used. The water based RFL adhesives are applied on cord fabric during "dipping" process which is the final step of cord fabric production. The strength of the bonds formed between the rubber and the cord is examined with adhesion tests. Adhesion is a very important parameter in high tenacity cord reinforced rubber products. This is because cord-rubber adhesion is a factor which directly effects the tire life and performance.

RFL adhesive formulation has been used as an adhesive material in all synthetic fiber reinforced materials for over half a century because of its stable structural features and low cost. However, both resorcinol and formaldehyde are the chemicals which possess high risk for human and environmental health, and therefore their use is limited. Regarding this subject, significant feedbacks have come from international organizations, manufacturers and end users. It is known that the resorcinol causes itching and rash when it contacts the skin, irritates the eye and shows toxic properties in liver and cardiovascular systems.

Formaldehyde is riskier than resorcinol for human health and safety. In 2004, formaldehyde was classified as group 2A chemical (probably carcinogenic to humans) by a group of scientists in International Agency for Research on Cancer (IARC) of World Health Organization, and later as group 1 (carcinogenic for humans). In 2009, formaldehyde was included in the list of chemicals causing leukemia by IARC. In line with this, formaldehyde was claimed to be a gene mutagen. Even low level of formaldehyde (1 ppm) can cause eye, nose and throat irritation.

Although formaldehyde-based resins are advantageous in terms of cost, both producers and consumers search for alternatives because of the reasons stated above. Therefore, especially in recent years, researchers have been working on the development of resorcinol and formaldehyde-free cord fabric dip solutions. The preparation of formaldehyde-free dip solutions have been reported in various studies.

United States Patent document no US20120041113, an application known in the state of the art, discloses preparing a composition comprising an epoxy, a blocked isocyanate, an epoxy curing agent and vinyl pyridine latex.

International Patent document no WO9600749, another application known in the state of the art, discloses the application of dipping solutions formulated with three functional-epoxy resins, styrene-butadiene-vinyl pyridine and styrene-butadiene-acrylonitrile-acrylic acid latex to polyethylene terephthalate (PET) cord fabric and its strength of adhesion with rubber.

United States Patent document no U.S. Pat. No. 5,118,545, another application known in the state of the art, discloses the synthesis of an aramide comprising multiple double bonds. It is stated that the synthesized resin is applied on the aramide-based cord fabric and that the double bonds in the aramide resin are vulcanized with the double bonds in rubber while the amide groups provide physical adhesion to the aramide fiber.

U.S. Pat. No. 4,472,463 discloses dipping non-adhesive activated PET fibers with two-step dipping process. The first dipping step comprises aromatic glycidyl ester epoxy and blocked isocyanate, while the second dipping step comprises two different latexes. The first latex is styrene-butadiene-vinyl pyridine copolymer, and the other one is acrylic acid-methyl methacrylate-styrene copolymer. It is stated that the H-adhesion values are higher than that of RFL dipped fibers.

United States Patent document no US20040249053, another application in the state of the art wherein an environmentally friendly dipping material is disclosed, discloses that the maleinized-polybutadiene is rendered water-soluble by reacting with polyethylene glycol. The PET cords modified with epoxy are first coated with this resin and then with styrene-butadiene-vinyl pyridine latex. The said resin exhibited lower adhesion strength relative to the fabrics treated with RFL.

SUMMARY OF THE INVENTION

The objective of the present invention is to provide a dipping material, which comprises more environmentally benign chemicals and provides high performance for cord fabrics, instead of the chemicals used in the state of the art.

Another objective of the present invention is to provide a dipping material production method, which enables the cord fabrics to give the desired effect by being processed for a shorter period of time relative to the method known in the state of the art and provides high performance for cord fabrics.

A further objective of the present invention is to provide a dipping material providing high performance for cord fabrics which has pale yellow color and thus makes it possible to produce cords in desired colors.

DETAILED DESCRIPTION OF THE INVENTION

In an inventive dipping material composition providing high performance for cord fabrics, there are functional acrylic resin (polymer) involving carboxylic acid, epoxy resin, blocked polyisocyanate, styrene-butadiene and styrene-butadiene-vinyl pyridine latexes. In the polymers comprising carboxylic acid, at least one of the monomers such as acrylic acid, methacrylic acid, itaconic acid, crotonic acid, cinnamic acid, maleic acid is employed in order to provide functionality to the acrylic resin. In the preferred embodiment of the invention, the amount of carboxylic acid within the acrylic polymer is between 10-100% by mole. In one embodiment of the invention this ratio is preferably kept between 30-70 mol %. Then, pH value of this composition comprising water and acrylic polymer is adjusted. In the preferred embodiment of the invention, ammonium is added to the composition to reach a pH value of 7-12, preferably 7-10. After pH is adjusted to the desired level, epoxy is added into the composition. In the preferred embodiment of the invention, the epoxy which is used is either a water soluble epoxy or a water-based dispersion. As the epoxy, at least one of glycidyl-based glycerol, sorbitol epoxy, diethylene glycol diglycidyl ether, polyethylene glycol diglycidyl ether, polypropylene glycol diglycidyl ether, 1,6-hexanediol glycidyl ether, trimethylol propane polyglycidyl ether, polyglycerol polyglycidyl ether, pentaerithiole polyglycidyl ether, diglycerol polyglycidyl ether, phenol novalac epoxy, cresol novalac epoxy, cresol novalac and bisphenol A epoxy resins is used. However their use is not limited to these. Any epoxy which is water soluble or can be prepared as dispersion in water can be used in this invention.

In the preferred embodiment of the invention, water-based blocked isocyanate or water-based polyurethane prepolymer comprising blocked polyisocyanate groups is used. As polyisocyanate, at least one of tetramethylene diisocyanate, hexamethylene diisocyanate (1,6-diisocyanatohexane), octamethylene diisocyanate, decamethylene diisocyanate, dodecamethylene diisocyanate, aromatic isocyanates 2,4- or 2,6-tolylenediisocyanate, tetramethylxylene diisocyanate, p-xylene diisocyanate, 2,4'- or 4-4'-diisocyanatediphenylmethane, 1,3- or 1,4-phenylene diisocyanate is used alone or in the form of functional group attached to the polymers. At least one of phenol, thiophenol, chlorophenol, cresol resorcinol, p-sec-butylphenol, p-tert-butylphenol, p-sec-amylphenol, p-octylphenol, p-nonylphenol, tert-butyl alcohol, diphenylamine, dimethylaniline, phthalic imide, δ-valerolactam, ε-caprolactam, malonic acid dialkylester, acetylacetone, acetoacetic acid alkylester, acetoxime, methylethylketoxime, cyclohexanone oxime, 3-hydroxypyridine and acidic sodium sulfite can be used as free isocyanate blocking agent, but their use is not limited to these. In the preferred embodiment of the invention, the molecular weight of the waterborne polyurethane prepolymer comprising blocked isocyanate groups is in the range of 1000-10000 g/mol, in one embodiment of the invention this value is between 1500-3000 g/mol.

In the invention, vinylpyridine-styrene-butadiene, vinylpyridine-styrene-butadiene modified with carboxylic acid, styrene-butadiene, styrene-butadiene modified with carboxylic acid, natural latex, chloroprene latex and the like can be used. In the invention, a composition comprising 2 different latexes is used. The first latex is styrene-butadiene copolymer and the second is styrene-butadiene-vinyl pyridine terpolymer. 1,3-butadiene and 2-methyl-1,3-butadiene can be used as butadiene component, but its use cannot be limited to these. Styrene, α-methylstyrene, 2-methylstyrene, 3-methylstyrene, 4-methylstyrene, 2,4-diisopropilstyrene, 2,4-dimethylstyrene, 4-t-butylstyrene and hydroxymethylstyrene can be used as styrene component, but its use cannot be limited to these. 2-vinylpyridine, 3-vinylpyridine, 4-vinylpyridine, 2-methyl-5-vinylpyridine, 5-ethyl-2-vinylpyridine can be used as vinyl pyridine monomer, but the use is not limited to these. In the preferred embodiment of the invention, the solid amount inside the latex is between 35-45% by weight. The ratio of the solid of the $1^{st}$ latex to that of the $2^{nd}$ is in the range of 0.05-1 by weight; however preferably the said ratio should be in the range of 0.13-0.30.

The dipping material is obtained by adding all the materials mentioned in the previous steps into the water at room temperature and stirring it.

The compositions were prepared by using acrylic functional polymer, epoxies and polyisocyanates in different ratios. The said compositions were made ready for rubber by being dried in different drying and curing temperatures.

In the preferred embodiment of the invention, the acrylic resin is used in ratio of 0.5-10%, preferably 1.5-5% by weight; the epoxy is 2-10%, preferably 4.5-7% by weight, polyisocyanate is 5-17%, preferably 9-14% by weight; styrene-butadiene latex is 5-17%, preferably 10-13% by weight; styrene-butadiene-vinyl pyridine latex is 50-80%, preferably 65-75% by weight.

The invention is a composition which can be used in dipping of cords such as nylon 6.6, nylon 6, polyethylene terephthalate, polyethylene naphthalate, rayon, aramide, and its use is not limited to these. After the said cords are prepared in certain constructions (ply number and twist), it is dipped with the inventive dipping material and dried at between 100-210° C. first. Subsequently, they are cured at between 200-240° C. The dipped cords are made ready to be cured with rubber compound, and it is pressed to the unvulcanized rubber compound. The said composite material is generally cured at 170° C. under press for about 20 minutes, and the final cord reinforced composite is obtained.

The said dipping material composition is prepared using more environmentally friendly chemicals relative to RFL. Furthermore, the said method is advantageous in terms of both cost and short preparation time. The final product being pale yellowish does not create any visual pollution and also enables the preparation of cord fabrics in various colors by the addition of colorants.

Examples

The chemicals used in the said invention are acrylic resin, epoxy, polyisocyanate, latex, water and ammonium. Adding and stirring processes were performed via mechanical stirrer under room conditions. The ratios of chemicals used in the preparation of the aqueous composition are given in Table 1 by weight.

The amount of solids of the mixtures in the present invention was determined as 15%, and pH was adjusted to 9-10 range. The indexed peel adhesion strength values are given in Table 1. The adhesion of cords dipped with RFL to the rubber was taken as reference, and this value was considered as 100. The dipping solution shown as RFL in the invention is the D-5 dipping whose intellectual property rights belong to General Tire Company (USA). Two layered 1400 dtex nylon 6.6 yarns were twisted as 396×396, and the twisted cord was dipped into the inventive dipping solutions.

The cord treated with control (RFL) dipping solution was first dried for 60 seconds at 130° C., and then cured for 60 seconds at 235 and 230° C., respectively. The dipping solutions in the invention were passed through 3 ovens at different temperatures. The temperature of the 1$^{st}$ oven is kept between 110-210° C., preferably between 150-200° C.; the temperature of the 2$^{nd}$ furnace is between 220-245° C., preferably between 225-240° C.; the temperature of the 3$^{rd}$ furnace is kept between 210-235° C., preferably between 220-230° C.

Five cords were placed parallel to each other on the rubber mixture for the adhesion test. The said mixture was cured at 170° C. under press, and then tested by pulling in Instron device. Here, the detachment value of the cord from the cured rubber was measured as kg.

As the acrylic functional polymer (resin) waterborne polymeric materials having 50% solid content and carboxylic acid and polybasic alcohol groups are used.

Glycerol based glycidyl resin was used as the epoxy. The said resin is 100% water soluble.

Water based, caprolactam blocked 1,4-phenylene diisocyanate with 60% solid content was used as the blocked polyisocyanate.

Styrene-butadiene latex is a material with a solid content of 41% and a pH of 10.4.

Styrene-butadiene-vinyl pyridine is a material with a solid content of 41% and a pH of 10.5.

TABLE 1 is the view of the table wherein the peel adhesion values of 3 different inventive mixtures and Resorcinol-Formaldehyde-Latex (RFL) adhesive solution are compared after applying to nylon 6.6 followed by curing.

| Composition | Acrylic resin (%) | Epoxy (%) | Isocyanate (%) | SBR latex (%) | VP latex (%) | Peel adhesion * |
|---|---|---|---|---|---|---|
| 1 | 2.4 | 6.6 | 11.1 | 12.0 | 68.0 | 107.9 |
| 2 | 1.8 | 5.1 | 13.0 | 12.0 | 68.0 | 103.1 |
| 3 | 4.3 | 5.5 | 10.2 | 12.0 | 68.0 | 101.4 |
| Control (RFL) | | | | | | 100.0 |

*indexed

The invention claimed is:

1. A dipping material composition characterized in that it comprises a functional acrylic polymer resin containing carboxylic acid, epoxy resin, blocked polyisocyanate, styrene-butadiene-latex (SBR) and styrene-butadiene-vinyl-pyridine latexes (VP), wherein in its content the acrylic polymer resin is used in a ratio of 0.5-10% by weight, the epoxy is 2-10% by weight, polyisocyanate is 5-17%, by weight styrene-butadiene latex is 5-17% by weight, styrene-butadiene-vinyl pyridine latex is 50-80% by weight.

2. The dipping material composition of claim 1, wherein the acrylic polymer resin is used in a ratio of 1.5-5% by weight.

3. The dipping material composition of claim 1, wherein the epoxy is 4.5-7% by weight.

4. The dipping material composition of claim 1, wherein the polyisocyanate is 9-14% by weight.

5. The dipping material composition of claim 1, wherein the styrene-butadiene latex is 10-13% by weight.

6. The dipping material composition of claim 1, wherein the styrene-butadiene-vinyl pyridine latex is 65-75% by weight.

7. The dipping material composition according to claim 1, wherein the carboxylic acid is formed with at least one of the monomers selected from acrylic acid, methacrylic acid, itaconic acid, crotonic acid, cinnamic acid and maleic acid.

8. The dipping material composition according to claim 1, wherein the carboxylic acid content therein is between 10-100% by mole.

9. The dipping material composition providing of claim 8, wherein the carboxylic acid content therein is between 30-70% by mole.

10. The dipping material composition according to claim 1, wherein the epoxy resin is water soluble or a water based dispersion.

11. The dipping material composition according to claim 10, wherein the epoxy resin is at least one of glycidyl based glycerol, sorbitol epoxy, diethylene glycol diglycidyl ether, polyethylene glycol diglycidyl ether, polypropylene glycol diglycidyl ether, 1,6-hexanediol glycidyl ether, trimethylol propane polyglycidyl ether, polyglycerol polyglycidyl ether, pentaerythritol polyglycidyl ether, diglycerol polyglycidyl ether, phenol novalac epoxy, cresol novalac epoxy, cresol novalac and bisphenol A.

12. The dipping material composition according to claim 1, wherein the blocked polyisocyanate used is either water based blocked polyisocyanates or water based polyurethane prepolymers.

13. The dipping material composition according to claim 12, wherein the water based blocked polyisocyanates or water based polyurethane prepolymers is at least one of tetramethylene diisocyanate, hexamethylene disocyanate (1,6-diisocyanatohexane), octamethylene diisocyanate, decamethylene diisocyanate, dodecamethylene diisocyanate, aromatic isocyanates 2,4- or 2,6-tolylene diisocyanate, tetramethylxylene diisocyanate, p-xylene diisocyanate, 2,4'- or 4-4'-diisocyanatediphenylmethane, 1,3- or 1,4-phenylene diisocyanate and wherein the blocked polyisocyanate is used alone and in the form of a functional group attached to the polymer.

14. The dipping material composition according to claim 1, wherein the blocked polyisocyanate is obtained by blocking free isocyanates with at least one of the blocking agents selected from the group consisting of phenol, thiophenol, chlorophenol, cresol, resorcinol, p-sec-butylphenol, p-tert-butylphenol, p-sec-amylphenol, p-octylphenol, p-nonylphenol, tert-butyl alcohol, diphenylamine, dimethylaniline, phthalic imide, δ-valerolactam, ε-caprolactam, malonic acid dialkylester, acetylacetone, acetoacetic acid alkylester, acetoxime, methylethylcetoxime, cyclohexanonoxime, 3-hydroxypyridine and acidic sodium sulfite.

15. The dipping material composition according to claim 12, wherein the water based polyurethane prepolymer has a molecular weight of which is in the range of 1000-10000 g/mol.

16. The dipping material composition according to claim 15, wherein the water based polyurethane prepolymer has a molecular weight of which is in the range of 1500-3000 g/mol.

17. The dipping material composition according to claim 1, wherein at least one of said styrene-butadiene-latex (SBR) or styrene-butadiene-vinyl-pyridine latexes (VP) is selected from the group consisting of vinylpyridine-styrene-butadiene, vinylpyridine-styrene-butadiene modified with carboxylic acid, styrene-butadiene, and styrene-butadiene modified with carboxylic acid.

18. The dipping material composition according to claim 17, wherein the butadiene component of the styrene-butadiene-latex (SBR) or styrene-butadiene-vinyl-pyridine latexes (VP) is 1,3-butadiene and 2-methyl-1,3-butadiene.

19. The dipping material composition according to claim 17, wherein the styrene component of the styrene-butadiene-latex (SBR) or styrene-butadiene-vinyl-pyridine latexes (VP) is α-methylstyrene, 2-methylstyrene, 3-methylstyrene, 4-methylstyrene, 2,4-diisopropylstyrene, 2,4-dimethylstyrene, 4-t-butylstyrene and hydroxymethylstyrene.

20. The dipping material composition according to claim 17, wherein the vinyl pyridine is selected from 2-vinylpyridine, 3-vinylpyridine, 4-vinylpyridine, 2-methyl-5-vinylpyridine and 5-ethyl-2-vinylpyridine.

21. The dipping material composition according to claim 17, wherein the latex has a solid content of between 35-45%.

22. The dipping material composition according to claim 21, wherein the ratio of the solid content of styrene-butadiene latex to the solid content of styrene-butadiene-vinylpyridine latex is in the range of 0.05-1 by weight.

23. The dipping material composition according to claim 22, wherein the ratio of the solid content of styrene-butadiene latex to the solid content of styrene-butadiene-vinylpyridine latex is in the range of 0.13-0.30 by weight.

24. A method of producing the dipping material composition according to claim 1, characterized by the steps of:
(a) adding acrylic polymer resin containing carboxylic acid into water,
(b) adjusting the pH value to 7-12 by adding ammonium,
(c) adding epoxy resin, blocked polyisocyanate, styrene-butadiene-latex (SBR) and styrene-butadiene-vinyl-pyridine latexes (VP) at room temperature, and
(d) stirring.

25. A method of preparing a cord reinforced composite characterized by the steps of:
(a) preparing cords in determined construction (ply number and twist),
(b) treating the prepared cords with the dipping material composition according to claim 1,
(c) drying the dipped cords at 100-210° C.,
(d) curing the dried cords at 200-240° C.,
(e) embedding the cords in an unvulcanized rubber compound,
(f) subjecting the unvulcanized rubber compound to a vulcanization process at a temperature of 170° C. under press for about 20 minutes, and
(g) obtaining the final composite material reinforced with cord.

26. The method according to claim 25, wherein the cord is selected from nylon 6.6, nylon 6, polyethylene terephthalate, polyethylene naphthalate, rayon, or aramide.

* * * * *